(12) United States Patent
Xie

(10) Patent No.: US 9,042,488 B2
(45) Date of Patent: May 26, 2015

(54) PHASE OFFSET COMPENSATOR

(75) Inventor: Changsong Xie, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/593,820

(22) Filed: Aug. 24, 2012

(65) Prior Publication Data

US 2012/0314814 A1     Dec. 13, 2012

Related U.S. Application Data

(63) Continuation of application No. PCT/CN2010/076576, filed on Sep. 2, 2010.

(51) Int. Cl.
*H04L 27/00* (2006.01)
*H04L 27/227* (2006.01)

(52) U.S. Cl.
CPC .......... *H04L 27/227* (2013.01); *H04L 27/0014* (2013.01); *H04L 2027/0057* (2013.01); *H04L 2027/0067* (2013.01); *H04L 2027/0069* (2013.01)

(58) Field of Classification Search
CPC ............. H04L 7/0029; H04L 27/2334; H04L 2027/0057; H04L 2027/0067; H04L 2027/0069; H04L 27/0014; H04L 27/227
See application file for complete search history.

(56) References Cited

U.S. PATENT DOCUMENTS

| 4,370,749 | A | * | 1/1983 | Levy et al. ................. 375/346 |
| 4,953,186 | A | * | 8/1990 | Levy et al. ................. 375/371 |
| 6,100,755 | A | * | 8/2000 | Ishii ........................... 329/304 |
| 6,177,835 | B1 | * | 1/2001 | Grebowsky et al. ......... 329/304 |
| 6,236,267 | B1 | | 5/2001 | Anzil |
| 7,456,682 | B2 | * | 11/2008 | Adachi ....................... 329/308 |
| 7,606,498 | B1 | | 10/2009 | Wu et al. |
| 2002/0126748 | A1 | * | 9/2002 | Rafie et al. ................. 375/229 |
| 2003/0174783 | A1 | | 9/2003 | Rahman et al. |
| 2004/0032842 | A1 | * | 2/2004 | Mesecher et al. ........... 370/335 |
| 2004/0161055 | A1 | * | 8/2004 | Sinha .......................... 375/322 |
| 2005/0078398 | A1 | * | 4/2005 | Hutchins ...................... 360/67 |
| 2005/0207519 | A1 | * | 9/2005 | Phang et al. ................ 375/354 |
| 2006/0189295 | A1 | * | 8/2006 | Adachi ....................... 455/337 |
| 2006/0245766 | A1 | | 11/2006 | Taylor |

(Continued)

FOREIGN PATENT DOCUMENTS

CN     1825839 A    8/2006
EP     1696624 A1   8/2006
WO    WO 2009/114123 A2   9/2009

OTHER PUBLICATIONS

PCT International Search Report and Written Opinion of the International Searching Authority mailed Jun. 9, 2011, issued in related International Application No. PCT/CN2010/076576, Huawei Technologies Co., Ltd. (10 pages).

(Continued)

*Primary Examiner* — Kenneth Lam

(57) ABSTRACT

A phase offset compensator for compensating a phase offset is provided. The phase offset includes a first phase sub-offset and a second phase sub-offset. The phase offset compensator includes a feedback loop comprising a first loop filter, the feedback loop being configured to compensate the first phase sub-offset of the phase offset, and a feed forward loop comprising a second loop filter, the feed forward loop being configured to compensate the second phase sub-offset of the phase offset.

5 Claims, 3 Drawing Sheets

(56) References Cited

U.S. PATENT DOCUMENTS

2008/0157881 A1* 7/2008 Dent et al. ............. 331/18
2011/0051782 A1* 3/2011 Gupta et al. ............ 375/140

OTHER PUBLICATIONS

EPO Extended European Search Report mailed Aug. 13, 2012, issued in related European Patent Application No. 10856584.7, Huawei Technologies Co., Ltd. (7 pages).

Chinese first Office Action mailed Jul. 24, 2012, issued in related Chinese Patent Application No. 201080024474.X (11 pages).

Faulkner, Michael, "Amplifier Linearization Using RF Feedback and Feedforward Techniques", *IEEE Transactions on Vehicular Technology*, vol. 47, No. 1, Feb. 1998, pp. 209-215.

Lee, Il-Gu, et al., "High Accuracy and Low Complexity Timing Offset Estimation for MIMO-OFDM Receivers", Wireless Communications and Networking Conference, 2006, IEEE Las Vegas, Nevada, Apr. 3-6, 2006, pp. 1439-1443.

* cited by examiner

PHASE OFFSET COMPENSATOR

CROSS-REFERENCE TO RELATED APPLICATION

This application is a continuation of International Application No. PCT/CN2010/076576, filed on Sep. 2, 2010, entitled "Phase offset compensator", which is hereby incorporated herein by reference.

TECHNICAL FIELD

The present disclosure relates to phase offset compensation, in particular to phase offset compensation for carrier recovery in particular in intradyne coherent communication systems.

BACKGROUND OF THE INVENTION

In digital communication systems, carrier recovery plays an important role for detection of transmitted information at a receiver. Usually, carrier recovery, often referred to as frequency and phase recovery, may be performed upon the basis of a feedback loop architecture using e.g. a Costas loop, as described by John P. Costas in "Synchronous Communications", Proceedings of the IRE, 1956. However, due to a delay of the feedback loop, the resolution bandwidth tends to be limited so that such structures are suitable for compensating slowly varying phase fluctuations. In order to compensate for rapidly varying phase fluctuations, e.g. the Viterbi & Viterbi detection approach as e.g. described in "Nonlinear estimation of PSK modulated carrier phase with application to burst digital transmission", IEEE Trans. IT, vol. 29, No. 4, July 1983, may be deployed, which, however, may suffer from considerable complexity.

SUMMARY OF THE INVENTION

A goal to be achieved by the present disclosure is to provide an efficient phase compensation concept which may, simultaneously, compensate for slowly varying phase offsets and rapidly varying phase offsets in particular in carrier recovery systems.

The present disclosure is based on the finding that an efficient phase compensation approach may be provided to a feedback loop for slowly varying phase offsets and, additionally, a feed forward loop for rapidly varying phase offsets are deployed within the same phase offset compensator. Since both loops may share a common phase offset detector and even part of filters, a complexity may, according to some implementations, be reduced. Furthermore, the feed forward and the feedback loop may be coupled to each other, e.g. serially concatenated, so that low complexity implementations are possible.

According to an aspect, the present disclosure relates to a phase offset compensator for compensating a phase offset, the phase offset comprising a first phase sub-offset and a second phase sub-offset. The phase offset compensator comprises a feedback loop comprising a first filter, the feedback loop being configured to compensate the first phase sub-offset of the phase offset, and a feed forward loop comprising a second loop filter, the feed forward loop being configured to compensate the second phase sub-offset of the phase offset. The first sub-offset may be a phase offset which varies slower than the second phase sub-offset over time.

According to an implementation form, the feedback loop and the feed forward loop are concatenated, in particular serially concatenated. By way of example, the feedback loop and the feed forward loop may thus operate on the same phase offset detection signal which may be provided by a lookup table.

According to an implementation form, a mid-stage output of the feedback loop is provided to an input of the feed forward loop or wherein a mid-stage output of the feed forward loop is provided to an input of the feedback loop.

According to an implementation form, an output of the second loop filter may be provided to the first filter. Thereby, both loops are coupled to each other.

According to an implementation form, the first loop filter may comprise a first order loop filter and a second order loop filter which may be arranged in parallel.

According to an implementation form, the phase offset compensator may comprise a multiplier for multiplying the output of a Cordic unit or lookup table whose input is the addition of the output of the first order loop filter and the second order loop filter. Therefore, an output may be provided for compensating the phase offset.

According to an implementation form, the output of the first multiplier may be provided to a second multiplier of a second loop filter for second stage phase offset compensation so that the feedback loop compensation and the feed forward loop compensation are serially concatenated.

According to an implementation form, the first loop filter may comprise a Costas loop filter, e.g. a Costas loop filter of the first order and/or of the second order.

According to an implementation form, the first loop filter may comprise a low pass filter.

According to an implementation form, the feed forward loop may be configured to compensate the second phase loop-offset which varies faster over time than the first phase loop-offset. Thus, the feed forward loop may be configured to compensate the residual phase offset which cannot completely be compensated upon the basis of the feedback loop.

According to an implementation form, the phase offset compensator may comprise a phase offset detector which is common for the feedback loop and for the feed forward loop. Preferably, the phase offset detector is configured to detect the phase offset upon a basis of an input signal.

According to an implementation form, the phase offset detector may comprise a lookup table, in which the in-phase component and quadrant component of a quantized complex signal are the addresses of the lookup table. Thus, the output is the phase difference between the phase of the complex signal and its QPSK decision.

According to an implementation form, the phase offset detector may comprise a signal phase detector and a subtractor for subtracting the phase of an input signal from the phase of an output of the signal to provide a phase offset detection signal.

According to an implementation form, the phase offset compensator may comprise a first multiplier for multiplying a reception signal with the output of a Cordic unit or a lookup table whose input is the output of the first loop filter, a phase offset detector for detecting the phase offset upon the basis of the input signal, the phase offset detector being configured to provide a phase offset detection signal to the first loop filter and to the second loop filter, the phase offset detection signal indicating the phase offset, and a second multiplier for multiplying the delayed input signal with the output of a Cordic unit or a lookup table whose input is the output of the second loop filter.

According to a further aspect, the present disclosure relates to a carrier recovery device, comprising a receiving filter and the phase offset compensator.

According to a further aspect, the present disclosure relates to a phase offset compensation method for compensating a phase offset, the phase offset comprising a first phase sub-offset and a second phase sub-offset, the phase offset compensation method comprising compensating the first phase sub-offset using a feedback loop with a first loop filter, and compensating the second phase sub-offset using a feed forward loop comprising a second loop filter.

BRIEF DESCRIPTION OF THE DRAWINGS

Further embodiments of the present disclosure will be described with respect to the following figures, in which.

DETAILED DESCRIPTION OF IMPLEMENTATION FORMS OF THE INVENTION

Figure 1:
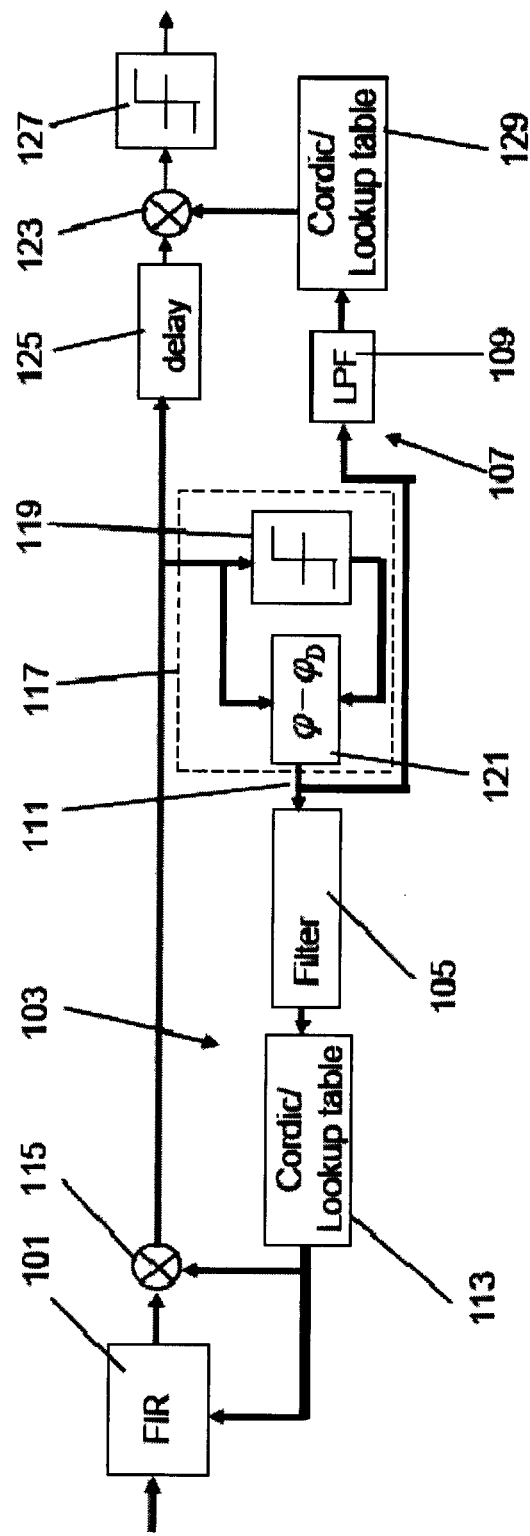
FIG. 1 shows a carrier recovery device according to an implementation form.

FIG. 1 shows a carrier recovery apparatus comprising a receive filter 101, e.g. a FIR (Finite Input Response) filter, and a phase offset compensator according to an implementation form. The phase offset compensator further comprises a feedback loop 103 comprising a first loop filter 105. The phase offset compensator further comprises a feed forward loop 107 comprising a second loop filter 109. The feedback loop 103 and the feed forward loop 107 may be connected e.g. at a point 111 to form e.g. a concatenated loop structure. The first loop filter 105 may comprise a Costas loop filter, a low pass filter, or a first order loop filter and/or a second order loop filter. The second loop filter 109 may comprise a low pass filter.

An output of the first loop filter 105 is a phase offset estimate and may be converted into a complex number whose real part is the cosine of the estimated phase offset, whose imaginary part is the sine of the estimated phase offset. This conversion may be implemented by using Cordic function or using a lookup table. The conjugate of this complex number may be connected to an input of a multiplier 115 multiplying an output of the receive filter 105 to get the phase corrected receive signal. The conjugate of this complex number may further be provided to the receive filter 101 for updating its filter tap weights.

The phase offset detector 117 is common for the feedback loop 103 and for the feed forward loop 107. The phase offset detector 117 may be implemented by using a lookup table. Its output (phase offset) will be provided to the feedback loop 103 and to the feed forward loop 107 via the common point 111.

The phase offset compensator may further comprise a second multiplier 123 multiplying a complex number whose phase is the inverse of a phase offset estimated by the second loop filter 109 with a delayed output of the first multiplier 115. The delay between the output of the first multiplier 115 and the input of the second multiplier 123 may be achieved by an delay element 125 which may be provided to compensate for the delay which may be introduced by the feedback loop 103 and/or feed forward loop 107, the feed forward loop 107 and the phase offset detector 117. Thus, the delay element 125 delays the input signal, which undelayed version is provided to the phase offset detector 117. An output of the second multiplier 123 is provided to a further signal detector 127.

Figure 2:
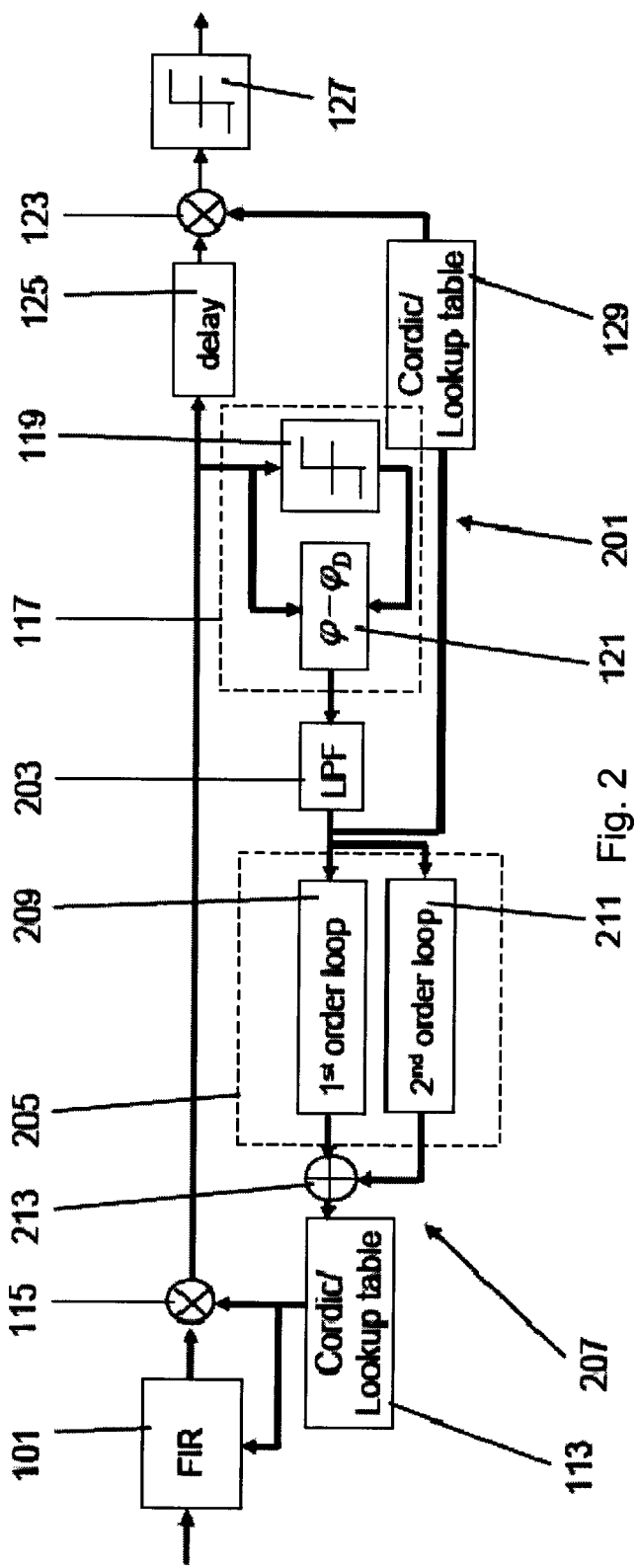
FIG. 2 shows a carrier recovery device according to a second implementation form.

FIG. 2 shows a carrier recovery device comprising a phase offset compensator according to another implementation form. In difference to the phase offset compensator depicted in FIG. 1, the phase offset compensator shown in FIG. 2, comprises a feed forward loop 201 with a low pass filter 203 having an input which is coupled to an output of the phase offset detector 117. An output of the low pass filter 203 is coupled forward to the second multiplier 123 and to a first loop filter 205 of a feedback loop 207. Thus, the low pass filter 203 of the feed forward loop 201 is jointly used for the feed forward loop 201 and for the feedback loop 207.

The first loop filter 205 of the feedback loop 207 may comprise a first order loop filter 209 and a second order loop filter 211. The first order loop filter 209 and the second order loop filter 211 simultaneously receive an output of the low pass filter 203. The outputs of the first order loop filter 209 and of the second order loop filter 211 are provided to inputs of an adder 213 having an output connected to a Cordic unit or lookup table and then to the first multiplier 115 and to the receive filter 101.

Figure 3:
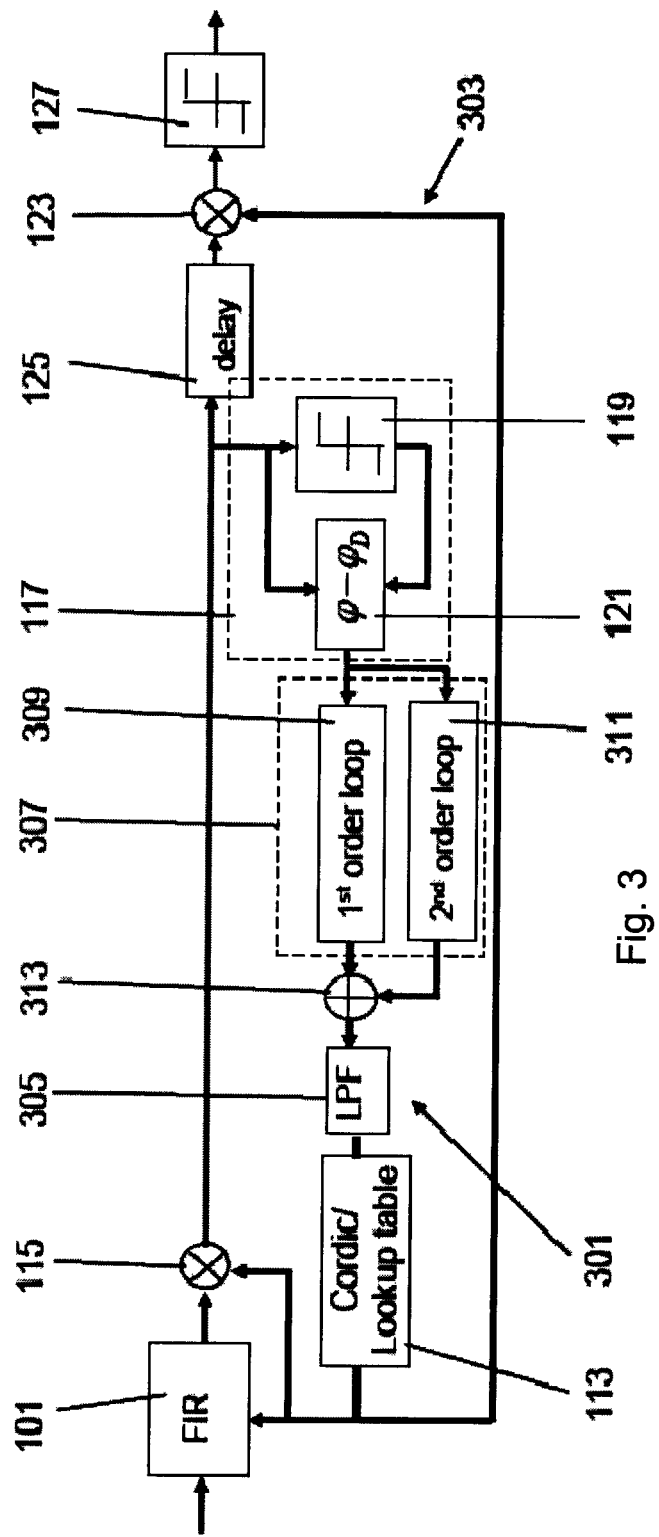
FIG. 3 shows a carrier recovery device according to a third implementation form.

FIG. 3 shows a carrier recovery device having a phase offset compensator according to another implementation form. The phase offset compensator comprises a feedback loop 301 coupled to the output of the phase offset detector 117. An output of the feedback loop 301 is used as an input for a feed forward loop 303. More specifically, the output of the feedback loop 301 is provided to an input of a low-pass filter 305, which may also be a part of the feed forward loop 303. An output of the low-pass filter 305 is connected to a Cordic unit or lookup table and then to the inputs of the first and second multipliers 115 and 123. Furthermore, the output of the low-pass filter 305 may be provided to the receive filter 101 for tap weights update.

The feedback loop 301 comprises a first loop filter 307 which may comprise a first order loop filter 309 and a second order loop filter 311 simultaneously receiving the output of the phase offset detector 117, i.e. the phase offset detection signal. The outputs of the first order loop filter 309 and of the second order loop filter 311 are provided to a further adder 313. An output of the further adder 313 is provided to the low-pass filter 305.

With reference to the implementation forms as shown in FIGS. 1 to 3, a structure of a joined feedback and feed forward carrier recovery is deployed where the feedback loops 103, 207, 301, may comprise first order loop filter 209, 309 and second order loop filter 211, 311. The first order loop filter 209, 309 may respectively be used for estimating a phase sub-offset, wherein the second order loop filter 211, 311 may be used for estimating accumulated phase sub-offset due to a frequency offset. Thus, the feedback loops 107, 201, 303 may converge to slowly varying phase sub-offset which may be compensated by back-rotating the sum of the phase sub-offsets estimated by the whole feedback loop 103 as e.g. depicted in FIG. 1, 207 as e.g. depicted in FIGS. 2 and 301, 305 as e.g. depicted in FIG. 3. Nevertheless, the residual, fast varying phase offset may be compensated by the feed forward loop 107, 201 and 303. Moreover, the phase offset detector 117 may simultaneously be provided for the feedback loop and the feed forward loop as a first stage phase offset estimator.

According to some implementations, a tolerance to distortion due to e.g. a transmit and a receive laser line-width and fiber nonlinear effects, e.g., cross phase modulation effect (XPM) and self-phase modulation (SPM) effect may be increased, so that the transmission reach may be increased according to some implementation forms.

In the preceding specification, the subject matter has been described with reference to specific exemplary embodiments. It will, however, be evident that various modifications and changes may be made without departing from the broader spirit and scope of the invention as set forth in the claims that follow. The specification and drawings are accordingly to be regarded as illustrative rather than restrictive. Other embodiments may be apparent to those skilled in the art from consideration of the specification and practice of the embodiments disclosed herein.

The invention claimed is:

1. A phase offset compensator for compensating a phase offset, the phase offset comprising a first phase sub-offset and a second phase sub-offset, the phase offset compensator comprising:
    a feedback loop configured to compensate the first phase sub-offset of the phase offset;
    a feed forward loop configured to compensate the second phase sub-offset of the phase offset;
    wherein the feedback loop and the feed forward loop commonly comprise a phase offset detector, a first loop filter comprising a first order loop filter and a second order loop filter arranged in parallel, an adder, a second loop filter and a Cordic unit, and the phase offset detector is configured to detect the phase offset upon a basis of an input signal and a lookup table in which the in-phase component and quadrant component of a quantized complex signal are the addresses of the lookup table, the first order loop filter is configured to receive the output of the phase offset detector and estimate a third phase sub-offset, the second order loop filter is configured to receive the output of the phase offset detector and estimate an accumulated phase sub-offset introduced by a frequency offset, the adder is configured to sum up the third phase sub-offset and the accumulated phase sub-offset, the second loop filter is a low-pass filter configured to filter the output of the adder, the Cordic unit is configured to implement conversion on a phase offset estimate output by the second loop filter.

2. The phase offset compensator of claim 1, wherein the feedback loop and the feed forward loop are concatenated.

3. The phase offset compensator of claim 1, wherein the feed forward loop is configured to compensate the second phase sub-offset which varies faster over time than the first phase sub-offset.

4. A carrier recovery device, comprising:
    a receive loop filter; and
    the phase offset compensator of claim 1.

5. A phase offset compensation method for compensating a phase offset, the phase offset comprising a first phase sub-offset and a second phase sub-offset, the phase offset compensation method comprising:
    compensating the first phase sub-offset using a feedback loop; and
    compensating the second phase sub-offset using a feed forward loop;
    wherein the feedback loop and the feed forward loop commonly comprise a phase offset detector, a first loop filter comprising a first order loop filter and a second order loop filter arranged in parallel, an adder, a second loop filter and a Cordic unit, and the phase offset detector is configured to detect the phase offset upon a basis of an input signal and a lookup table in which the in-phase component and quadrant component of a quantized complex signal are the addresses of the lookup table, the first order loop filter is configured to receive the output of the phase offset detector and estimate a third phase sub-offset, the second order loop filter is configured to receive the output of the phase offset detector and estimate an accumulated phase sub-offset introduced by a frequency offset, the adder is configured to sum up the third phase sub-offset and the accumulated phase sub-offset, the second loop filter is a low-pass filter configured to filter the output of the adder, the Cordic unit is configured to implement conversion on a phase offset estimate output by the second loop filter.

* * * * *